(No Model.)

F. BOARDMAN.
PIVOTING CHUCK.

No. 330,551. Patented Nov. 17, 1885.

Witnesses.
Lauritz W. Müller
G. B. Maynadier

Inventor
Frederick Boardman,
by W. A. Copeland,
his Attorney

UNITED STATES PATENT OFFICE.

FREDERICK BOARDMAN, OF MANSFIELD, MASSACHUSETTS.

PIVOTING-CHUCK.

SPECIFICATION forming part of Letters Patent No. 330,551, dated November 17, 1885.

Application filed July 23, 1884. Serial No. 138,521. (No model.)

*To all whom it may concern:*

Be it known that I, FREDERICK BOARDMAN, a citizen of the United States, residing at Mansfield, in the county of Bristol and State of Massachusetts, have invented a new and useful Pivoting-Chuck, of which the following is a specification.

My invention relates to improvements in chucks for watch-makers' lathes; and it consists, first, in pivoting the clamping-jaws in radial slots in the body of the chuck, and in the use of a sliding tapering sleeve to assist in the adjustment of the jaws and to bind them when in position; also in the use of independent adjusting-screws in the backs of the jaws; also in the combination of the hollow spindle and pump-center for bringing the work to adjustment between the pump-center and jaws, with a binding-screw for holding it to its adjustment.

Figure 3:
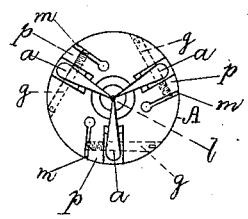
Figure 1:
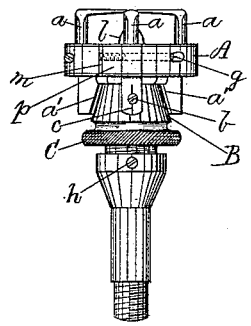
Figure 2:
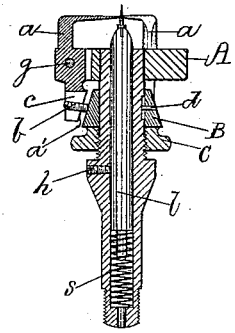

In the drawings, Figure 1 is a side view of a chuck embodying my invention. Fig. 2 is a longitudinal section. Fig. 3 is an end view.

A is the body of the chuck, having three or more radial slots in which the jaws $a\ a\ a$ are pivoted. The backs of the jaws are beveled off at $a'$, and the sliding sleeve B is tapered, so that when the sleeve is moved forward by the following-nut C it will operate against the inclined backs of the jaws to close them and clamp them upon the work.

$d$ is a guide-pin to prevent the sleeve B from revolving. The adjusting-screws $b\ b\ b$ serve as independent centering devices by which the jaws may be moved singly into the position required and nice adjustment secured. It is preferable to make a thin slot, $c$, in the backs of the jaws, the adjusting-screws $b$ being a little larger than the screw-hole, so that there is a constant spring-pressure on the screw to prevent it working loose.

The operation of mounting the work is as follows: The shaft or pump-center $l$ is pressed down in the centering-cup, compressing the spring S until the end of the shaft is sunk level with the body of the chuck, when it is locked in its place by the binding-screw $h$. The sliding sleeve B is moved back, so that the jaws may be opened to admit of inserting the work. The staff of the wheel is then inserted on the end of the pump-center $l$, and the binding screw $h$ turned to release the pump-center, so that it may move forward and carry the wheel into position. The jaws are then brought forward to the work by the sleeve B and following-nut C, and centered by adjusting-screws $b$. When adjusted as desired, the pump-center is again locked by the binding-screw $h$. By making a narrow slit, $m$, in the body of the chuck a slight spring is given to the part $p$ through which the arbor $g$ passes. The end of arbor $g$ bears against the body on the farther side of the slit $m$, so that by turning the screw the part $p$ may be sprung back to cause the back of the jaw to fit more or less closely in the slot.

What I claim is—

1. A chuck having three or more clamping-jaws pivoted in radial slots in the body of the chuck, and independent adjusting-screws, substantially as described.

2. In a chuck, the clamping-jaws $a$, pivoted in radial slots, one end of the arbor $g$ being screwed into the yielding part $p$, constructed as described, all substantially as set forth.

3. A chuck having three or more clamping-jaws pivoted in radial slots in the body of the chuck, sliding sleeve B, and adjusting-screws $b\ b\ b$, substantially as described.

4. In a chuck, the combination of jaws $a\ a\ a$, sliding sleeve B, and following-nut C, substantially as set forth.

5. In a chuck, the combination of jaws $a\ a\ a$, adjusting-screws $b\ b\ b$, sliding sleeve B, pump-center $l$, spring S, and binding-screw $h$, substantially as described.

FREDERICK BOARDMAN.

Witnesses:
 JOHN R. SNOW,
 W. A. COPELAND.